United States Patent [19]

Jorgensen et al.

[11] Patent Number: 4,898,357

[45] Date of Patent: Feb. 6, 1990

[54] ELECTRICAL BOX SUPPORT

[75] Inventors: Robert W. Jorgensen, Niles, Mich.; Kenneth R. Schnell, South Bend, Ind.

[73] Assignee: Hubbell Incorporated, Orange, Conn.

[21] Appl. No.: 284,553

[22] Filed: Dec. 15, 1988

[51] Int. Cl.⁴ ............................................. H02G 3/12
[52] U.S. Cl. ...................................... 248/906; 52/221; 174/48; 174/58; 220/3.5; 220/3.9
[58] Field of Search ................... 174/48, 49, 53, 58; 52/221, 220, 27; 248/906, 221.4, 27.1; 220/3.3, 3.5, 3.9

[56] References Cited

U.S. PATENT DOCUMENTS

| | | | |
|---|---|---|---|
| 2,461,145 | 2/1949 | Craver | 248/216 |
| 2,512,188 | 6/1950 | Wait et al. | 248/205 |
| 2,859,930 | 11/1958 | Brunsting et al. | 248/27 |
| 3,440,590 | 4/1969 | Post | 174/53 |
| 3,633,782 | 1/1972 | Bellinger | 220/3.5 |
| 3,651,245 | 3/1972 | Moll | 174/53 |
| 3,767,151 | 10/1973 | Seal et al. | 248/205 R |
| 4,057,164 | 11/1977 | Maier | 220/3.6 |
| 4,233,878 | 11/1980 | McGauran et al. | 85/7 |
| 4,732,356 | 3/1988 | Medlin, Sr. | 248/27.1 |

Primary Examiner—Michael Safavi
Attorney, Agent, or Firm—Jerry M. Presson; Walter C. Farley

[57] ABSTRACT

A support structure for an electrical box includes an elongated support member which is fastened into a hole in the rear wall of the box, the depth of insertion being determined by a stop flange. The length of the support member can be adjusted to approximately match the distance between the rear wall of the box and the inner surface of a sheet of wall material behind the rear wall by breaking off portions of the support member at one of a plurality of weakened regions formed by a uniform sequence of annular recesses. The support, thus installed, limits motion of the unmounted end of the box.

7 Claims, 2 Drawing Sheets

4,898,357

ELECTRICAL BOX SUPPORT

SPECIFICATION

This invention relates to an improved support for an electrical box of the type which is mounted on a stud between two parallel walls.

BACKGROUND OF THE INVENTION

When an electrical box is mounted on a stud, it is common for one side of the box to be attached to the stud using flanges of some type which are mounted or mountable on the box. The depth of the box, extending perpendicular to the sheets of drywall or wallboard which will be attached to the opposite faces of the stud, is generally shallower than the distance between the inner faces of the wallboard. Since the box may have a significant dimension in the direction away from the stud, pressure against the un-mounted side of the box can cause the box to move within the cavity. This can have undesirable effects, but is at the very least, unacceptable from an aesthetic point of view. In addition, building codes commonly require some form of stabilization of the box which causes the installers to adopt such techniques as attaching a piece of dummy stud to the unmounted side of the box, the term "dummy stud" referring to a short piece of stud which is attached to the side of the box simply to stabilize it, but which performs no other function.

Such make-shift techniques satisfy the needs of the moment but are wasteful of time and materials and add expense for the ultimate consumer.

Various techniques have been suggested for overcoming this difficulty including such measures as providing threaded members or clip-on members to provide bracing for the box. However, such devices either are not particularly reliable or they form a metal protrusion within the box which is unacceptable because it can interfere with the wiring or other devices put in the box and presents a significant danger of coming in contact with electrically energized components therein.

SUMMARY OF THE INVENTION

Accordingly, an object of the present invention is to provide an improved support for an electrical box which is adaptable to various circumstances and presents no danger of interference with wiring or devices installed in the box.

A further object is to provide such a support which is easily manufactured, is inexpensive, and is quick and easy to install.

Briefly described, the invention comprises a support structure for an electrical box of the type having a back wall, first and second generally parallel sidewalls, an open front and means for mounting the box with the first sidewall against a stud and with the back wall extending away from the stud between two generally parallel sheets of wall material. The depth of the box, measured in the direction perpendicular to the sheets of wall material, is significantly less than the distance between the inner surfaces of the sheets. The support structure comprises a hole of preselected size extending through the backwall closer to the second sidewall than the first sidewall, and a support member comprising an elongated body of electrically nonconductive material having retainer means at one end dimensioned to be received in and to engage the hole in the backwall. A stop flange adjacent the retainer means abuts an outer surface of the backwall of the box to establish a depth to which the retainer means extends into the box. The elongated body also has means defining a plurality of recesses substantially uniformly spaced along the body from the other end thereof to a location near the stop flange, the recesses forming weakened regions at which the body can be readily broken to remove a portion of the body of selected length and to thereby reduce the length of the support member to a length, measured between the remaining end thereof and the stop flange, which is substantially equal to the difference between the depth of the box and the distance between the inner surfaces of the wall material, thereby forming a support to restrict movement of the box between the sheets of wall material.

BRIEF DESCRIPTION OF THE DRAWINGS

In order to impart full understanding of the manner in which these and other objects are attained in accordance with the invention, particularly advantageous embodiments thereof will be described with reference to the accompanying drawings, which form a part of this specification, and wherein.

DESCRIPTION OF THE PREFERRED EMBODIMENTS

Figure 1:
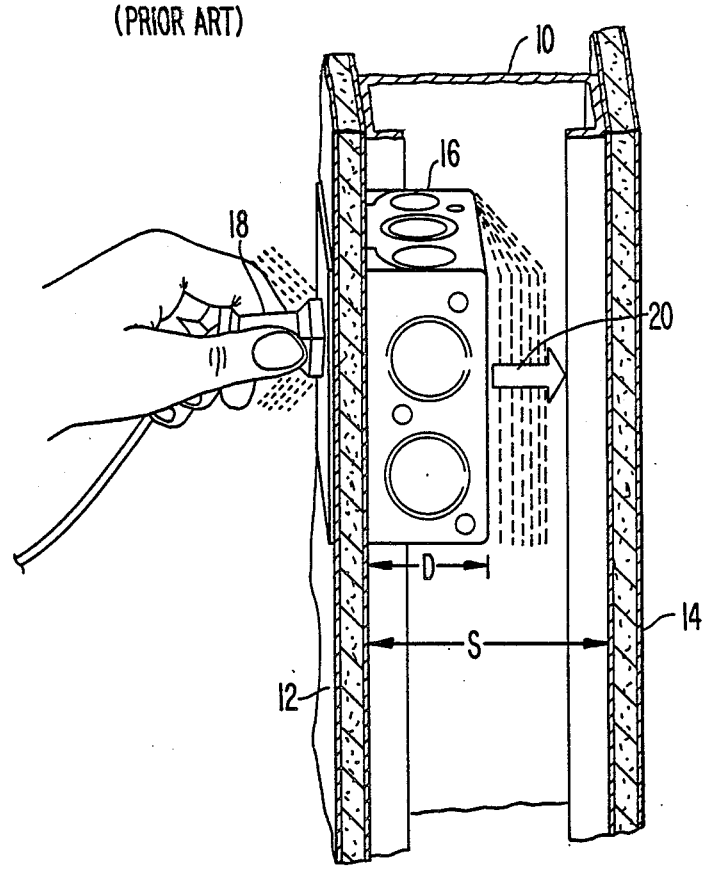
FIG. 1 is a perspective view of a prior art structure lacking a support.

Referring first to FIG. 1, the environment in which an electrical box is likely to be mounted includes a stud 10 having opposite end faces to which sheets of wall material 12 and 14 will be attached.

An electrical box 16 is attached to stud 10 at one side thereof with the other side of the box being essentially unsupported. While it may be supported to some degree by the sheet material 12, when an electrical plug 18 is pushed into an outlet, for example, the free end of box 16 is capable of moving in the direction of arrow 20, allowing flexing of wires and other disadvantageous effects.

It will be observed, first, that the depth of box 16 is significantly less than the perpendicular spacing S between the inner surfaces of sheets 12 and 14 of wall material. It will also be noted that the stud 10, as illustrated in FIG. 1, is a generally C-shaped metal stud and that the box is mounted on its open side. While this is probably the least sturdy arrangement, the same basic problem exists whether the stud is wood or metal and whether the box is mounted adjacent the open or the closed side of a metal stud.

The specific arrangement for mounting the one side of the box 16 to stud 10 is not of any particular consequence and has not been illustrated in detail. The problem exists with substantially any box having substantially any mounting arrangement, and the invention is equally applicable to a wide variety of such boxes.

The difference between the distances D and S is extremely difficult to predict because of variations in the sizes of metal studs and also electrical boxes. Metal studs are presently available in three sizes, namely, 1.5, 2.5 and 3.625 in., the latter two being most popular. Electrical boxes are 1.5 or 2.125 in. deep, generally, although boxes for receiving electrical devices can be almost any depth.

Figure 2:
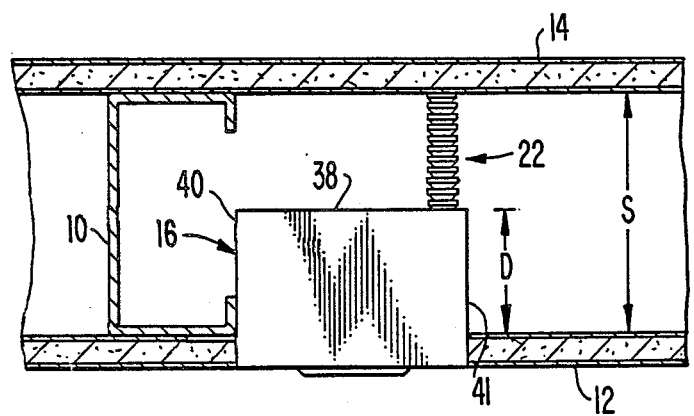
FIG. 2 is a top plan view of a box mounted with a support in accordance with the present invention.
Figure 3:
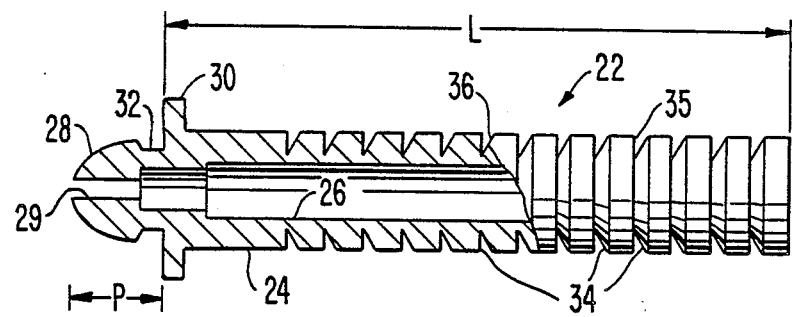
FIG. 3 is a side elevation in partial section of a support member in accordance with the present invention.

A support structure in accordance with the invention, as shown in FIGS. 2–5, includes a support member indicated generally at 22, the length of which can be altered to closely approximate the difference between the distances D and S. Considering the dimensions mentioned above, if we assume that a 1.5 in. deep box is mounted on a stud which is 3.625 in. deep, the longest difference between dimensions D and S will be 2.125 in. It is sufficient to limit the motion of the box to ⅛ in. Accordingly, the longest effective length of the support member is made to be approximately 2 inches, this being dimension L as illustrated in FIG. 3.

Figure 4:
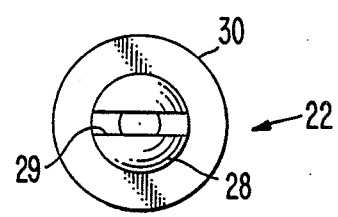
FIG. 4 is an end view of the support member of FIG. 3.

The support member, as shown in FIGS. 3 and 4, includes an elongated body which is preferably molded from a polymeric material which is electrically nonconductive, is generally cylindrical and is preferably tubular. The body 24 of support member 22 has an internal cavity 26 which extends entirely through the body. At one end thereof is a retainer means comprising a knob 28 which is separated into two axially protruding portions by a slot 29. Knob 28 has a smoothly tapering exterior surface and terminates at an annular recess 32 which is dimensioned to receive the wall of box 16. A stop flange 30 is formed on the exterior of the body and has a diameter somewhat larger than the knob to abut the outer surface of the rear wall of the box, thereby defining a depth P which is the maximum depth of protrusion of the support member into the box.

The remainder of the body 24 has a substantially uniform outer diameter which is interrupted by a plurality of annular recesses 34, each recess being defined by a flat surface 35 lying in a plane substantially perpendicular with the longitudinal central axis of body 24 and a conical surface 36 which extends between lines of intersection with a cylinder defining the exterior surface of that portion of the body and its associated flat surface 35. These annular recesses define a series of weakened zones which, as seen in the sectioned portion of FIG. 3, are significantly thinner than the remainder of the body and can be easily broken to reduce the length of the body in ⅛ in. increments, the axial interval between flat surfaces 35 being preferably ⅛ in.

Figure 5:
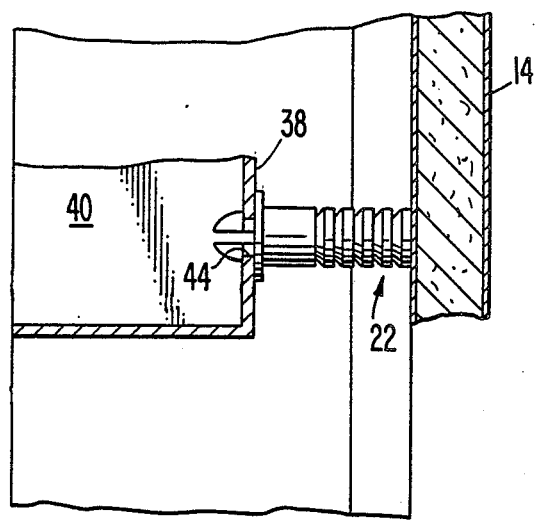
FIG. 5 is a partial side elevation, in partial section, of a box having a support in accordance with the invention.

Referring particularly to FIGS. 2 and 5, box 16 has a rear wall 38 and generally parallel, opposite sidewalls 40 and 41, and will also have at least top and bottom walls to complete the enclosure. The front is generally open, to be closed by a cover plate or the like. Rear wall 38 must be provided with a hole 44 which, in the specific embodiment shown, is a ¼ in. diameter hole. The largest diameter of knob 28 is greater than ¼ in. but, because of slot 29 and a degree of resilience in the polymeric material used to mold the member, the portions of knob 28 can elastically flex toward each other, allowing the knob to be pushed into the box from the rear until the front surface of flange 30 abuts the outer surface of wall 38, whereupon the flexed members snap outwardly, allowing the wall around opening 44 to rest in annular groove 32. Support member 22 then protrudes rearwardly from the wall, perpendicular to the rear wall. A suitable material for the support member is moldable polyphenylene oxide sold under the name of NORYL although a variety of other materials can be used.

In the example shown in FIG. 5, the difference between the box depth D and the spacing between walls S is 1 in. which means that a 1 in. section must be removed from the total length L of the support member. Since each segment represents 0.125 in., eight such segments are broken from the end of body 24 farthest from the knob, using pliers or the like. The box can then be installed in the manner illustrated generally in FIG. 2 and FIG. 5 and the "new" end of the support member will abut or be closely adjacent to the inner surface of the sheet 14 of wall material, limiting movement of the box when subjected to various forces. The removed portion is, of course, discarded.

The support in accordance with the present invention is designed particularly for use with metal boxes and has the advantage that the only protrusion into the interior of the box is an electrically non-conductive one which is of a generally smooth configuration, avoiding any problems of interfering with the placement of devices or wires in the box. Also, there are no sharp edges or the like to interfere with the integrity of insulation. Adjustment of the support member to suit the dimensions encountered in any particular installation does not require extending any additional part of the support member into the interior of the box as is necessary with some prior art devices. The support structure is therefore secure, simple and easy to use, in addition to being reliable and safe.

While one advantageous embodiment has been chosen to illustrate the invention, it will be understood by those skilled in the art that various changes and modifications can be made therein without departing from the scope of the invention as defined in the appended claims.

What is claimed is:

1. A support structure for an electrical box of the type having a back wall, first and second generally parallel side walls, an open front and means for mounting the box with the first side wall against a stud and with the back wall extending away from the stud between two generally parallel sheets of wall material, the depth of said box in the direction perpendicular to said sheets of wall material being significantly less than the distance between the inner surfaces of said sheets of wall material, the support structure comprising means defining a hole of preselected size through said back wall significantly closer to said second side wall than said first side wall; and a support member comprising
an elongated body of electrically nonconductive material having retainer means at one end dimensioned to be pushed into said hole in said back wall for holding said body on said box extending perpendicularly rearwardly therefrom, a stop flange adjacent said retainer means for abutting an outer surface of said back wall of said box and establishing a depth to which said retainer means extends into said box, and means defining a plurality of recesses substantially uniformly spaced along said body from the other end thereof to a location near said stop flange, said recesses forming weakened regions at which said body can be broken to remove a portion of said body of selected length and to thereby reduce the length of said support member to a length, measured between the remaining end thereof and said stop flange, which is substantially equal to the difference between the depth of the box and the distance between the inner surfaces of said sheets of wall material, thereby forming a support to restrict movement of said box between said sheets of wall material.

2. A structure according to claim 1 wherein said body is generally cylindrical and tubular and includes a central passage extending into said body.

3. A structure according to claim 2 wherein said retainer means comprises a knob having a generally circular cross-section, an outer diameter slightly greater than said preselected diameter of said hole and a generally diametral slot separating said knob into at least two axially protruding portions, said nonconductive material of said body being sufficiently resilient so that said protruding portions can be elastically bent toward each other to permit passage of said knob into said hole.

4. A structure according to claim 3 wherein said recesses are annular recesses each defined by a generally flat surface lying in a plane which is substantially perpendicular to the central longitudinal axis of said body and a generally conical surface intersecting said plane, each said flat surface facing away from said stop flange so that, when a portion of said body is removed, the remaining end is generally perpendicular to said axis.

5. A structure according to claim 4 wherein the distances between said flat surfaces defining said recesses are all substantially equal to ⅛ in.

6. A structure according to claim 1 wherein said retainer means comprises a knob having a generally circular cross-section, an outer diameter slightly greater than said preselected diameter of said hole, an annular groove adjacent said knob having a diameter substantially equal to the diameter of said hole and a diametral slot separating said knob into two axially protruding portions, said nonconductive material of said body being sufficiently resilient so that said protruding portions can be elastically bent toward each other to permit passage of said knob into said hole.

7. A structure according to claim 1 wherein said recesses are annular recesses each defined by a generally flat surface lying in a plane which is substantially perpendicular to the central longitudinal axis of said body and a generally conical surface intersecting said plane, each said flat surface facing away from said stop flange so that, when a portion of said body is removed, the remaining end is generally perpendicular to said axis.

* * * * *